United States Patent [19]

Dankowski

[11] 4,138,857

[45] Feb. 13, 1979

[54] COOLING SYSTEM BRACKET ASSEMBLY FOR AUTOMOTIVE VEHICLES

[76] Inventor: Gerhard Dankowski, Rte. 2, Box 59A, Royse City, Tex. 75089

[21] Appl. No.: 820,099

[22] Filed: Jul. 29, 1977

Related U.S. Application Data

[63] Continuation-in-part of Ser. No. 713,352, Aug. 11, 1976, Pat. No. 4,063,431.

[51] Int. Cl.$^2$ .................. B60H 3/04; F25D 25/02
[52] U.S. Cl. ................................. 62/239; 62/243; 62/382; 248/646
[58] Field of Search ............... 62/239, 243, 244, 305, 62/302, 382; 416/146 R, 62, 244 R; 248/15, 16

[56] References Cited

U.S. PATENT DOCUMENTS

| | | | |
|---|---|---|---|
| 1,684,563 | 9/1928 | Swedman | 62/382 |
| 1,764,787 | 6/1930 | Hatch | 62/382 |
| 2,581,363 | 1/1952 | Creedon | 62/382 |
| 3,241,334 | 3/1966 | Amore | 62/382 |
| 3,306,067 | 2/1967 | Anglin | 62/243 |
| 3,606,762 | 9/1971 | Anglin et al. | 62/239 |
| 3,620,644 | 11/1971 | McLarty | 248/16 |
| 3,926,000 | 12/1975 | Scofield | 62/243 |

Primary Examiner—Lloyd L. King
Attorney, Agent, or Firm—Richards, Harris & Medlock

[57] ABSTRACT

A bracket assembly is provided for securing an auxiliary cooling system to a main automobile cooling system. The bracket assembly provides two one piece wire rods having their ends attached one to the other to form a closed loop. The loops are elongated with two parallel arms interconnected by curved ends. The loops are mounted parallel one to the other on an automobile cooling unit. An auxiliary cooling unit is mounted to the brackets by bolt assemblies which are engaged through the loops formed by the rods. The auxiliary cooling system may be positioned relative to the main cooling system by sliding the unit along the longitudinal length of the loops. The auxiliary system is fixed in a desired position by engaging the bolt assembly to clamp the auxiliary cooling system to the bracket assembly.

11 Claims, 9 Drawing Figures

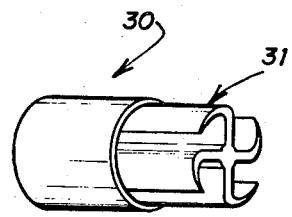
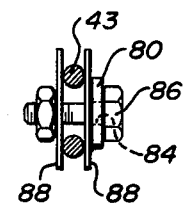
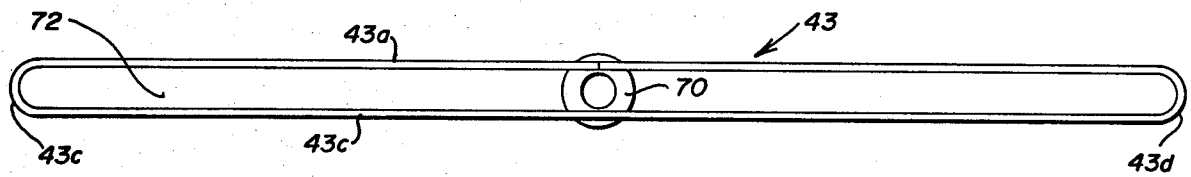
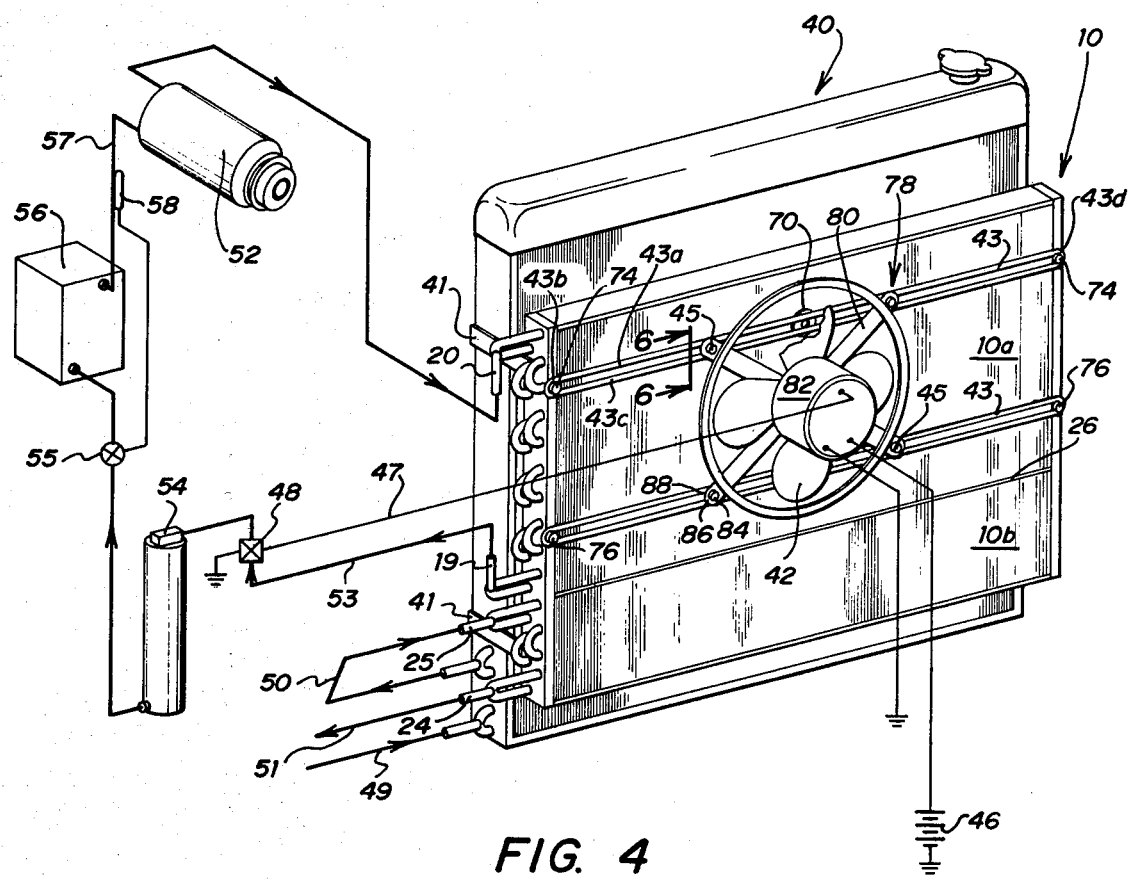

COOLING SYSTEM BRACKET ASSEMBLY FOR AUTOMOTIVE VEHICLES

CROSS REFERENCE TO RELATED APPLICATION

This application is a continuation-in-part of application Ser. No. 713,352, filed Aug. 11, 1976, now U.S. Pat. No. 4,063,431.

FIELD OF THE INVENTION

The invention relates to air-cooled heat exchanger units for automotive vehicles, and more particularly to a unitary heat exchange structure and bracket for mounting such structure.

PRIOR ART

Cooling systems for automobile engines have long been in use wherein the liquid coolant is delivered by a pump to the cylinder block, and directed forward along the row of cylinders to a thermostat. The thermostat controls the flow of the coolant from the engine block to a radiator, where a heat exchange occurs between the coolant and an air flow created by the combined effect of the forward motion of the vehicle and an engine fan.

Also well known are air conditioning systems for automotive engines, wherein a high pressure refrigerant vapor is discharged from a compressor in a superheated state and directed to a heat exchanger known as a condenser. There the refrigerant vapor is condensed through a heat exchange with a liquid coolant or the surrounding atmosphere. The liquid refrigerant is collected in a receiver in liquid communication with a thermostat expansion valve. The valve controls the flow of the liquid refrigerant to a heat exchanger known as an evaporator, where a transfer of heat occurs between the refrigerant and the space to be refrigerated. Vaporized refrigerant than is supplied to the suction side of the compressor where the cycle is repeated.

A recurring problem is automotive engines is the overheating of the engine and lubricants, particularly under load conditions including air conditioning and the towing of trailers. To overcome the heating problem, the capacity and number of circulation coils of the engine radiator has been increased, and a bottom tank has been added to the radiator to accommodate an interchange of heat between the coolant and the oil. Under load conditions, however, a further problem has been encountered. The engine or transmission oil may impart excessive heat to the coolant, thereby overheating the engine.

A further improvement to transmission and engine oil cooling systems has been the addition of air cooled heat exchangers. Typical of these are those disclosed in U.S. Pat. No. 2,502,554 to Bonanni; U.S. Pat. No. 3,334,704 to Geherke; and U.S. Pat. No. 2,554,437 to Alexander. The Bonanni patent discloses an oil cooling apparatus including an air cooled heat exchanger and a supplemental fan mounted forward of the engine radiator. The patents to Alexander and Geherke disclose an air cooled heat exchanger for cooling engine oil which is mounted forward of the engine radiator. Each of these systems has alleviated but not satisfactorily eliminated the overheating problem. Further, these units have not provided a satisfactory means for easily mounting and positioning the cooling systems.

With the advent of the Government Emission Standards, emission controls have been implemented to control exhaust emissions. Such emission controls have increased engine and exhaust system temperatures, and have caused a space problem in arranging the engine, air conditioning and emission control systems in the compact engine compartments. Such space limitations have restricted the number and size of cooling apparatus that may be accommodated, and have been reflected by a less than ideal space separation between heat exchange structures. As a result, heat transfers between heat exchange units have occurred, and overheating problems under load conditions have been more prevalent.

The present invention provides an automotive vehicle cooling system wherein a unitary heat exchange structure acts in concert with the engine radiator to condense refrigerant vapors, and cool lubricants without imparting excessive heat to the engine coolant.

The present invention further provides a bracket assembly for mounting auxiliary cooling systems adjacent to the engine radiator or air conditioning condenser which permits ease of adjustment of the added unit in relationship to the structure on which it is mounted.

SUMMARY OF THE INVENTION

An automotive vehicle cooling system is provided wherein both a refrigerant condenser and an oil cooler are combined in a unitary heat exchange structure. More particularly, a heat exchanger is comprised of a plurality of parallel and vertically disposed but horizontally spaced flat metallic fins. Two vertically spaced and multi-layered sets of interconnected U-shaped conduits extend horizontally across the metallic fins, most of which are severed along a horizontal line intermediate to the two conduit sets to form an air space therebetween. One conduit set is placed in the refrigerant flow path leading from the output of the air conditioning compressor. An oil conduit is passed through the engine radiator, and connected to the input of the second conduit set of the heat exchanger which directs the flow of the oil back into the normal flow path. The heat exchange structure is mounted forward but spaced apart from the engine radiator in the air path of the engine fan to provide both ram air and fan cooling.

In one aspect of the invention, heat exchange inserts are press fitted within the oil cooler conduits to maximize the heat exchange between the oil and the surrounding atmosphere.

In another aspect of the invention, an auxiliary fan is mounted on the front face of the heat exchanger, and activated by a pressure switch sensitive to the pressure head at the output of the condenser.

The auxiliary fan is secured to a pair of elongated wire brackets attached at each end to the heat exchange structure. The brackets are mounted such that they are parallel one to the other thereby permitting the auxiliary fan to be selectively positioned along the longitudinal length of the brackets by merely sliding the fan to the desired position and clamping it to the brackets.

In accordance with still another aspect of the invention, the heat exchange structure may be mounted on the engine radiator using the brackets described.

DESCRIPTION OF THE DRAWINGS

For a more complete understanding of the present invention and for further objects and advantages thereof, reference may now be had to the following description taken in conjunction with the accompanying drawings in which:

FIG. 3 is an illustration of an oil conduit partially cut away to reveal a heat exchanger insert;

FIG. 4 is a functional electromechanical block diagram of an automotive vehicle cooling system embodying the invention;

FIG. 5 is an enlarged plan view of bracket 43;

FIG. 6 is a section view taken along line 6—6 of FIG. 4;

DESCRIPTION OF PREFERRED EMBODIMENTS

Figures 1, 2:
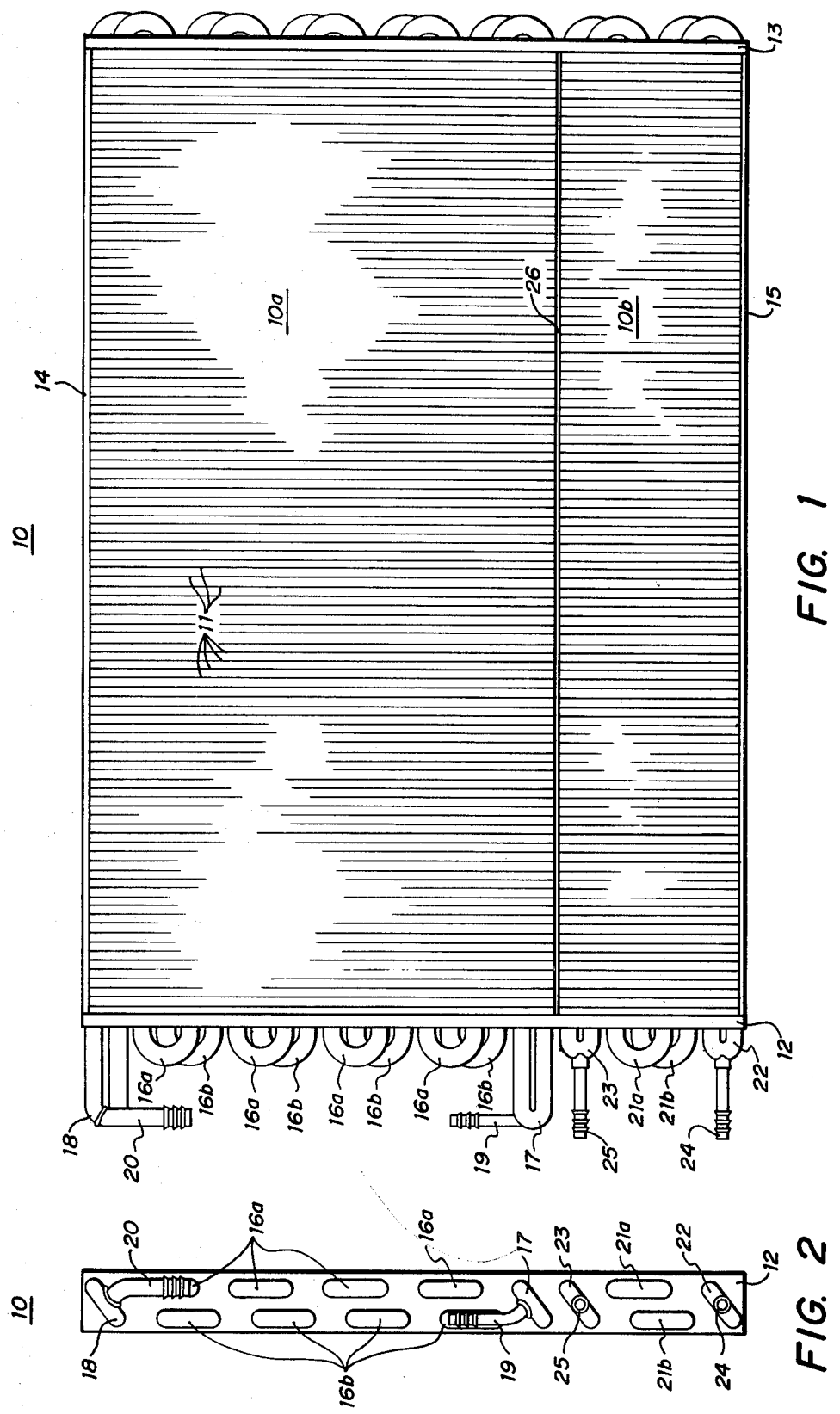
FIG. 1 is a front pictoral view of a heat exchanger according to the invention.
FIG. 2 is a side view of the heat exchanger of FIG. 1.

FIGS. 1 and 2 illustrate the front and a side view, respectively, of a heat exchanger 10 according to the invention. The heat exchanger 10 is comprised of parallel and vertically disposed but horizontally spaced flat metallic fins 11. Partially enclosing the metallic fins are side plates 12 and 13, and fin guards 14 and 15. Passing horizontally through the metallic fins and the side plates are two layer of interconnected U-shaped conduits 16a and 16b, which are joined by U-shaped connectors 17 and 18 to hose fittings 19 and 20, respectively. Vertically spaced from conduits 16a and 16b are two layers of U-shaped conduits 21a and 21b, which also pass horizontally through the metallic fins and side plates. Conduits 21a and 21b are joined by U-shaped connectors 22 and 23 to hose fittings 24 and 25, respectively.

Although conduits of a particular shape have been described, it is to be understood that other conduit orientations and shapes may be used with equal effectiveness. For example, conduits 16a, 16b and 21a, 21b may be horizontally or vertically disposed spirals.

An air space 26 is formed by severing plural ones of fins 11 along a horizontal line intermediate to conduits 16a, 16b and conduits 21a, 21b. The heat exchange between the upper and lower fin sections thereby is interrupted, and heat exchanger 10 effectively is partitioned into a condenser 10a and an air cooler 10b.

In the preferred embodiment described herein, fins 11, conduits 16a and 16b, and conduits 21a and 21b are made of aluminum for efficient heat transfer. It is to be understood, however, that the fins and conduits may be formed from any material having similar heat exchange properties. The fins 11 number approximately 205, and each is of a width of about 1.25 inches and a length of about 14 inches. The air space 26 is of the order of 10 millimeters in width. The conduits 16a, 16b and 21a, 21b have outer diameters of approximately 0.375 inches and inner diameters of approximately 0.25 inches. The centers of conduits 16a are displaced from the centers of conduit 16b by a distance of approximately 0.625 inches. The overall physical dimensions of heat exchanger 10 are such as to be accommodated within a space approximately 23.187 inches wide, 14 inches in height, and 1.31 inches in depth.

Side plates 12 and 13 preferably are made from steel or aluminum, while fin guards 14 and 15 may be a plastic or other material suitable for protecting the fins from damage.

In operation, high pressure refrigerant vapor is received from an air conditioning compressor at fitting 20. The vapor is condensed by the heat exchange between metallic fins 11 and the surrounding atmosphere. The condensed refrigerant is provided at fitting 19 leading to a receiver dryer (not shown).

Engine oil or transmission oil of an automotive vehicle enters fitting 25, and is cooled by the heat transfer between metallic fins 11 and the surrounding atmosphere. The cooled oil then is provided at fitting 24.

In accordance with the invention, heat flow between condenser 10a and oil cooler 10b is minimized by locating the oil cooler below the condenser rather than in the air path to the condenser, and by interposing air space 26 between the oil cooler and condenser.

FIG. 3 illustrates an oil conduit 30 which is partially cut away to expose a heat exchange insert 31 which extends the length of the conduit.

Referring to FIG. 3, the insert 31 is comprised of four curved surfaces depending laterally from a common center and separated by approximately 90 degrees. The insert preferably is made of aluminum, and is press fitted within conduit 30. The outer surface area of the curved surfaces are formed to maximize metal to metal contact with conduit 30, and thereby provide an efficient heat transfer. It has been found that such an insert substantially improves heat exchange between the oil flowing through conduits 21a, 21b of oil cooler 10b and the air moving between metallic fins 11.

FIG. 4 is an electromechanical functional block diagram illustrating an automotive vehicle cooling system.

Heat exchange 10 is mounted to the front face of an engine radiator 40 with brackets 41. An electrically energized fan 42 is mounted on slotted brackets 43 which are attached to and extend horizontally across condenser 10a of heat exchanger 10. As will be hereinafter discussed in greater detail, fan 42 may be positioned by sliding the fan along brackets 43, and may be held in place by tightening friction clamps 45.

The ground terminal of the electric motor driving fan 42 is connected to ground, and the voltage terminal of the motor is connected through a 12 volt DC source 46 to ground. An enable terminal of the fan motor is connected by way of a conductive line 47 to a pressure switch 48 having a ground terminal connected to ground.

Engine or transmisssion oil is supplied to a conduit 49 leading to the lower part of radiator 40. The oil flows through conduits extending horizontally across the radiator, and thence to a conduit 50 leading to oil cooler 10b of heat exchanger 10. The output of oil cooler 10b is supplied to a conduit 51 leading to an oil flow path.

A compressor 52 supplies a high pressure refrigerant vapor to condenser 10a of heat exchanger 10. The vapor is cooled, and the condensate is supplied to a conduit 53 which is connected to the input of pressure switch 48. The output of pressure switch 48 is in fluid communication with the input of a receiver dryer 54 which absorbs water vapor and supplies collected refrigerant condensates to a thermostatic expansion valve 55. The output of valve 55 is supplied to the input of an evaporator 56, which in turn supplies refrigerant vapors to a conduit 57 leading to the input of compressor 52. A thermostatic gas bulb 58 of valve 55 is placed in contact with conduit 57.

In the preferred embodiment, the pressure switch 48 may be of a type such as that manufactured and sold by Texas Instruments, Inc. of Versailles, Kentucky, and offered to the public as Model No. 20PS002KA26OR2-10R. Evaporator 56 may be of a type such as that manufactured by Danhard, Inc. of Dallas, Texas, and represented to the public as Model No. UN-245. Compressor 52 may be of a type manufactured and sold by the York Division of the Borg Warner Corporation of York, Pennsylvania, and represented to the public as Model No. F209, Part No. 16764. The receiver dryer 54 may be of a type such as that manufactured and sold by Singer Control Company of America of Milwaukee, Wisconsin, and available to the public as Model No. 70412-501. The electric motor or fan 42 may be of a type such as Model No. 8659FH manufactured and sold by Leece Nevilce Company of Cleveland, Ohio. The fan blades preferably are aluminum such as the type manufactured and sold by Brookside Corporation of McCordsville, Indiana, and represented to the public as Model No. 202312-1.

In operation, oil from the transmission or engine of an automotive vehicle is supplied to conduit 49, and circulated through the lower part of radiator 40 where an initial heat exchange occurs with the coolant in the radiator. The oil then is supplied through a conduit 50 to oil cooler 10b of heat exchanger 10 where the oil is air cooled before returning to its normal flow path by way of conduit 31. The circulation of the oil through both the radiator and the oil cooler 10b provides an efficient means of cooling the oil without imparting a prohibitive amount of heat to the radiator coolant. A reserve heat capacity thus is provided in the coolant to accommodate load conditions such as the running of the air conditioning or the towing of trailers.

The high pressure refrigerant vapors supplied by compressor 52 is circulated through the condenser 10a of heat exchanger 10, where the vapor is cooled and the condensate therefrom is supplied by way of conduit 53 through pressure switch 48 to the receiver dryer 54. Pressure switch 48 is sensitive to the pressure in conduit 53, and activates fan 42 by way of conducting line 47 when the pressure head exceeds a threshold value. Receiver dryer 54 absorbs water moisture and collects the condensed refrigerant. The condensate is supplied to the thermostatic expansion valve 55 which adjusts the flow rate of the liquid refrigerant to maintain a vapor state in conduit 57. The refrigerant vapor in conduit 57 enters the suction side of compressor 52 and is compressed to a higher pressure.

The cooling of the oil and the refrigerant vapor occurs as a result of a heat exchange between the metallic fins 11 of heat exchanger 10, and the air flowing through the heat exchanger to radiator 40. As before stated, the circulation of the oil through both the radiator and the oil cooler of heat exchanger 10 provides an efficient means for cooling the oil without imparting prohibitive amounts of heat to the radiator coolant. The reserve heat capacity of the radiator coolant further is preserved by interrupting the heat transfer between radiator 40, condenser 10a and oil cooler 10b. Accordingly, the spacing between heat exchanger 10 and radiator 40 preferably is at least 0.75 inches to effectively minimize the transfer of heat therebetween. In addition, the air space 26 interrupts the heat exchange between the condenser 10a and the oil cooler 10b.

When the automotive engine is operating, the engine fan (not shown) pulls air through heat exchange 10 and radiator 40. Further, when the vehicle is in forward motion, the refrigerants and oil circulating through heat exchanger 10 are cooled by a ram air effect supplementing the engine fan. Under severe load conditions where the engine fan and the ram air effect are not sufficient, the engine heat may increase as reflected by an increase in pressure in conduit 53. When the pressure head in conduit 53 exceeds a threshold value, however, switch 48 activates fan 42 to provide an additional air source.

Brackets 43 are formed in the preferred embodiment by contouring or bending a wire rod to form the brackets shown. In one embodiment, a 0.187 inch diameter wire stock is used although it will be understood that larger or smaller diameter wire may be used as required for strength and rigidity. Referring to FIG. 5 in conjunction with FIG. 4, each bracket 43 includes an upper arm 43a, a 180 degree bend 43b, and lower arm 43c and a 180 degree bend 43d. The wire rod used to form each bracket is of an appropriate length such that the ends are adjacent one to the other after the bracket has been formed. The ends are then welded or otherwise secured to form a closed loop. A brace 70 is attached, as by welding, to both ends of the wire rod as well as to arm 43c to add rigidity to the bracket.

As can be seen in FIG. 5, bracket 43 is formed such that upper arm 43a is parallel to lower arm 43c. This arrangement defines a uniform slot 72 intermediate of arms 43a and 43c along the entire length of the bracket being interrupted only by the positioning of brace 70. In a preferred embodiment of the invention, brackets 43 have a length substantially equal to the length of the heat exchanger or other apparatus on which the bracket is attached. Referring to FIG. 4, it is seen that brackets 43 are equal in width to condenser 10 and are attached thereto by appropriate screws 74 and 76.

Fan 42 is supported by a mounting structure 78 which includes arms 80 attached to and extending from fan housing 82. Arms 80 are prepared with apertures 84 at the outer ends thereof which receive friction clamps 45 therethrough. In a preferred embodiment of the invention, clamps 45 include a nut and bolt assembly 86 with appropriate washers 88 positioned on opposite sides of brackets 43 (FIG. 6).

It may be readily appreciated that the positioning of fan 42 is accomplished by merely loosening nut and bolt assemblies 86 and sliding the fan to any desired position along the length of brackets 43. When the fan has been positioned as desired, it is secured in place by tightening nut and bolt assemblies 86 to compress washers 88 against brackets 43.

Brackets 43 facilitate the assembly and alignment of fan 42 in several respects. Slot 72, formed by arms 43a and 43c, channels clamps 45 as the fan is moved along the length of the brackets. Thus, with the nut and bolt assemblies 86 in a loosened position, the fan may be easily moved from position to position along the length of the brackets until the desired position is located. Throughout this adjustment, the clamps and brackets positively retain the fan assembly adjacent the radiator while permitting free adjustment of the location of the fan. Then, when the fan is properly positioned, it is locked into place by merely tightening nut and bolt assemblies 86.

This bracket arrangement has been found to be particularly advantageous in that it facilitates the mounting of the fan unit and other comparable units where only limited space is available in the engine compartment area. In some situations, while it may be possible to initially secure the fan to the brackets at one point, it is necessary to relocate the fan prior to final assembly so as to avoid interference with other components in the engine compartment area. This is made possible in the present arrangement. Likewise, the fan may be readily repositioned to allow more room for making other repairs in the engine compartment area or where other additional components are added at a later date.

Additionally, the brackets are easily and inexpensively made. Each bracket is made from a single piece of wire rod which is formed into a closed loop with the ends being attached as by welding.

Figure 7:
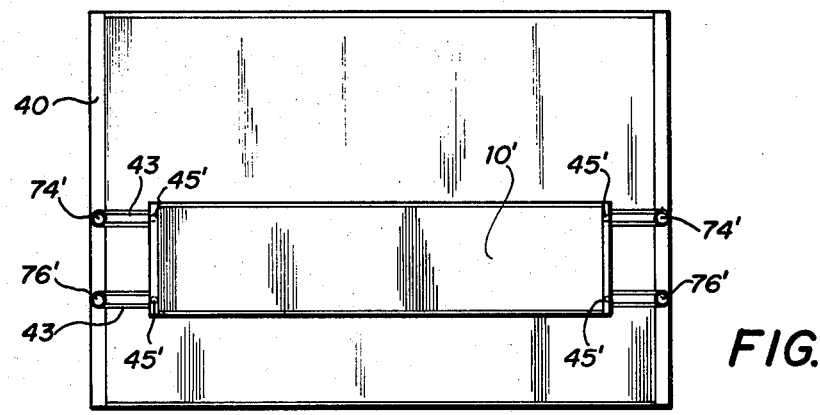
FIG. 7 illustrates an alternative embodiment of the present invention with an air conditioning condenser being mounted to an automobile radiator using the brackets of the present invention.

FIG. 7 illustrates the attachment of a smaller heat exchanger 10' to radiator 40 using brackets 43. Again, it will be appreciated that brackets 43 are the same width as radiator 40 and are attached directly to the radiator side walls by using screws 74' and 76'. Heat exchanger 10' is then attached to brackets 43 by clamps 45' in a similar manner as fan 42 is attached to brackets 43 as described and illustrated in FIG. 4. With this arrangement, heat exchanger 10' may be readily positioned along the length of brackets 43 as desired.

Figure 8:
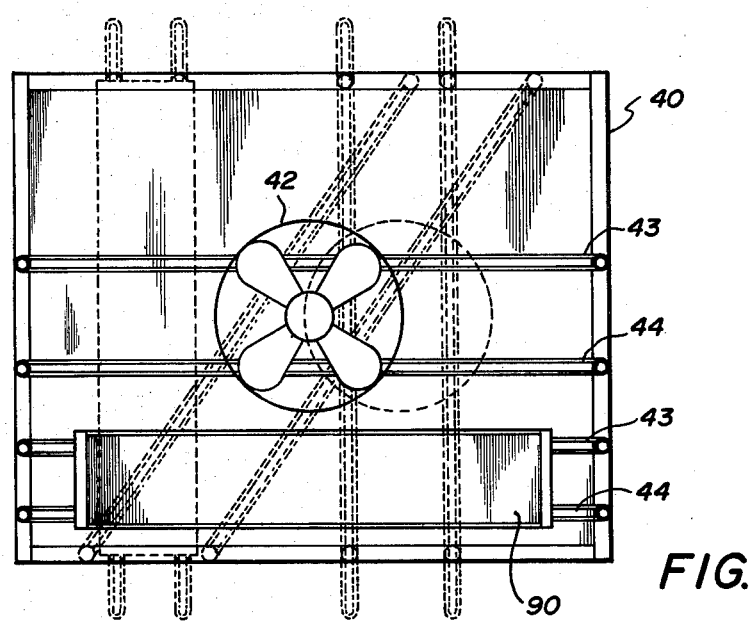
FIG. 8 is an alternative embodiment showing alternative mounting arrangements made possible by the brackets of the present invention.

FIG. 8 illustrates an alternative embodiment of the present invention wherein an auxiliary oil cooler 90 is substituted for heat exchanger 10. Oil cooler 90 may either be a heat exchanger for use in cooling engine oil or automatic transmission fluid as desired. Oil cooler 90 is mounted directly to the engine radiator 40 by using brackets 43. Additionally, FIG. 8 illustrates the simultaneous use of fan 42 with the fan being mounted to radiator 40 by brackets 43. Because of the arrangement of brackets 43, both oil cooler 90 and fan 42 may be positioned at any point along the length of the brackets thereby making optimum use of the available space in the engine compartment while positioning the cooling units at the most advantageous point in the ram air passageway into the engine.

FIG. 8 illustrates in phantom the numerous alternative positions in which both fan 42 and oil cooler 90 may be positioned by use of brackets 43. Specifically, the brackets may be mounted to radiator 40 vertically or even diagonally. These various alternative positions made possible by the design of brackets 43 permit the installation of either a cooling fan or heat exchange unit where space would otherwise not permit such installation. Just as important in the ease with which these units may be installed and properly positioned to their most advantageous position in the engine compartment without interference with existing components.

Figure 9:
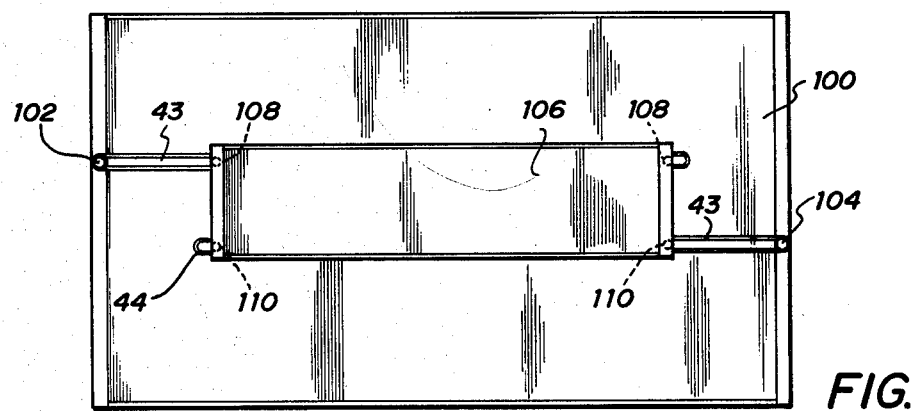
FIG. 9 shows still another alternative mounting made possible by the brackets of the present invention.

FIG. 9 illustrates the use of brackets 43 on a radiator 100 which is wider than the overall length of the individual brackets. In this arrangement, one end of a bracket 43 is attached by a suitable screw 102 to one side wall of radiator 100 with one end of another bracket 43 being attached by a suitable screw 104 to the opposite side wall of radiator 100. A heat exchange unit 106 is mounted between the brackets by the use of clamp bolts 108 and 110 as previously described. Heat exchanger 106 may be positioned along the length of brackets 43 as in the prior assemblies and the total assembly stabilized by fixedly clamping the heat exchanger to the brackets by engaging clamps 108 and 110. This arrangement has been found to be perfectly satisfactory and permanent once clamps 108 and 110 engage the heat exchanger to the brackets even though only one end of brackets 43 are secured to the engine radiator 100.

While brackets 43 have been discussed as used to mount various heat exchange and fluid cooling components, it will be appreciated that these brackets may likewise be used to mount numerous other components at points either in the engine compartment or other locations on automobiles and similar machinery. Thus, the present invention is not intended to be limited to its application for mounting heat exchange and fluid cooling components in the engine compartment area, but it is envisioned that those skilled in the art will recognize numerous uses of the brackets for mounting other components.

Thus, the present invention provides an automotive vehicle cooling system which combines an air conditioning condenser and an oil cooler in a unitary air cooled structure to conserve space. Heat transfer between the condenser and the oil cooler is minimized by an air space therebetween, and the unitary structure is mounted forward but spaced apart from the engine radiator to further minimize undesirable heat exchanges. In addition, lubricants are passed serially through the engine radiator, and thence through conduits in the oil cooler having heat exchange inserts therein to maximize the heat transfer to the surrounding atmosphere without imparting excessive heat to the engine coolant.

The present invention also provides a bracket arrangement which greatly facilitates both the mounting and positioning of components adjacent to the engine radiator. The brackets positively maintain the component being attached while permitting the free translation of the component along the brackets to any desired position. Not only do the brackets provide for the ease of installation of various components, but the brackets are also inexpensively produced.

Having described the invention in connection with certain specific embodiments thereof, it is to be understood that further modifications may now suggest themselves to those skilled in the art. For example, the novel features of the invention described herein may be applied to stationary engines as well as automotive vehicles. Further, the auxiliary fan may be activated by a temperature sensitive switch sensing oil temperature or engine heat when the air conditioning system is not in use. Such modifications, as fall within the scope of the appended claims, are intended to be covered by the present invention and this application for Letters Patent.

What is claimed is:

1. A bracket assembly for securing an auxiliary cooling system for a main automobile cooling system, comprising:
   a first support having two spaced arms and means for joining said arms in a parallel relationship,
   means for attaching said first support to said main cooling system, and
   means for selective clamping and auxiliary cooling system to said first support such that the auxiliary cooling system may be selectively moved along the longitudinal length of said arms to adjust the position of the auxiliary cooling system relative to the main cooling system.

2. The bracket assembly according to claim 1 wherein said joining means includes a first connector attached between said arms and a second connector attached between said arms and spaced from said first connector.

3. The bracket assembly according to claim 2 further comprising:
a brace member attached said arms intermediate of said connectors to provide support from one said arm to the other.

4. The bracket assembly according to claim 1 further comprising:
a second support having two spaced arms and means for joining said arms in a parallel relationship,
means for attaching said second support to said main cooling system parallel to said first support, and
means for selectively clamping said auxiliary cooling system to said second support for selective movement therealong.

5. A bracket assembly for securing an auxiliary cooling system to a main automobile cooling system, comprising:
a first elongated loop having two parallel arms joined at the ends thereof by connectors,
a second elongated loop having two parallel arms joined at the ends thereof by connectors,
first means for attaching said elongated loops to said main cooling system such that said loops are parallel one to the other, and
second means for selectively clamping the auxiliary cooling system to said loops such that the auxiliary cooling system may be selectively moved along the longitudinal length of said loops to adjust the position of the auxiliary cooling system relative to the main cooling system.

6. The bracket assembly according to claim 5 wherein said second means is characterized by bolt assemblies for engagement between the parallel arms of said elongated loops to thereby track said loops as the auxiliary cooling system is moved relative to the main cooling system.

7. A bracket assembly for attaching a first component to a second component comprising:
a first wire rod having its ends attached one to the other to form a closed loop, said loop being elongated with two parallel arms interconnected by curve ends,
means for attaching the loop formed by said wire rod to one of the components, and
means for selectively clamping the other of the components to the loop formed by said wire rod such that the other of the components may be clamped at any selected position along the longitudinal length of the elongated loop formed by said wire rod.

8. The bracket according to claim 7 further comprising: brace member attached between the two parallel arms of said rod intermediate of said first and second ends to provide support thereto.

9. The bracket according to claim 8 wherein said brace is attached to said loop at the point of connection of the ends of said rod.

10. A bracket assembly comprising:
a first one-piece wire rod having its ends attached one to the other to form a closed loop, said loop being elongated with two parallel arms interconnected by curved ends,
a second one-piece wire rod having its ends attached one to the other to form a closed loop, said loop being elongated with two parallel arms interconnected by curved ends,
first means for mounting said second rod on a first component parallel to said first rod, and
second means for selectively mounting a second component to said first and second rods such that said second component may be attached along the length of said rods.

11. The bracket assembly according to claim 10 wherein said second means is characterized by bolt assemblies for engagement through the loops formed by said first and second rods.

* * * * *

UNITED STATES PATENT AND TRADEMARK OFFICE
CERTIFICATE OF CORRECTION

PATENT NO. : 4,138,857
DATED : February 13, 1979
INVENTOR(S) : Gerhard Dankowski It is certified that error appears in the above-identified patent and that said Letters Patent are hereby corrected as shown below:

Column 1, line 38, change "than" to -- then --;
         line 40, change "is" first occurrence to -- in --.
Column 3, line 33, change "layer" to -- layers --.
Column 4, line 37, change "exchange" to -- exchanger --.
Column 5, line 31, change "conduit 31" to -- conduit 51 --.
Column 6, line 2, change "exchange" to -- exchanger --.
Column 7, line 49, change "in" to -- is --.
Column 8, line 59, change "and" to -- the --.
Column 9, line 3, after "attached" insert -- between --.
Column 10, line 4, change "curve" to -- curved --.

Signed and Sealed this

Twenty-ninth Day of May 1979

[SEAL]

Attest:

RUTH C. MASON
Attesting Officer

DONALD W. BANNER
Commissioner of Patents and Trademarks